(12) United States Patent
Kondo et al.

(10) Patent No.: US 7,734,069 B2
(45) Date of Patent: Jun. 8, 2010

(54) IMAGE PROCESSING METHOD, IMAGE PROCESSOR, PHOTOGRAPHIC APPARATUS, IMAGE OUTPUT UNIT AND IRIS VERIFY UNIT

(75) Inventors: Kenji Kondo, Kyoto (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/358,939

(22) Filed: Jan. 23, 2009

(65) Prior Publication Data
US 2009/0161965 A1 Jun. 25, 2009

Related U.S. Application Data

(62) Division of application No. 10/509,462, filed on Sep. 28, 2004, now Pat. No. 7,519,199.

(51) Int. Cl.
*G06K 9/00* (2006.01)
*H04L 9/00* (2006.01)

(52) U.S. Cl. .................. 382/117; 340/5.83; 713/186

(58) Field of Classification Search ......... 382/115–127; 340/5.1, 5.2, 5.52, 5.53, 5.8–5.86; 902/3; 713/186
See application file for complete search history.

(56) References Cited

U.S. PATENT DOCUMENTS 6,836,554 B1 12/2004 Bolle .................. 382/116

7,120,607 B2 10/2006 Bolle .................. 705/64

FOREIGN PATENT DOCUMENTS

| JP | 06-350914 A | 12/1994 |
|---|---|---|
| JP | 3307936 | 5/1996 |
| JP | 10-285383 A | 10/1998 |
| JP | 2000-11176 A | 1/2000 |
| JP | 2000-207536 A | 7/2000 |
| JP | 2000261789 A | 9/2000 |
| JP | 2000278584 A | 10/2000 |
| JP | 2001186507 A | 7/2001 |
| JP | 2001-273498 A | 10/2001 |
| JP | 2001-292298 A | 10/2001 |
| JP | 2002-361969 A | 12/2002 |
| JP | 2003-60887 A | 2/2003 |
| JP | 2003-85531 A | 3/2003 |
| JP | 2003-87632 A | 3/2003 |
| WO | WO 94/09446 | 4/1994 |

OTHER PUBLICATIONS

International Search Report for PCT/JP2004/004804, dated Jun. 1, 2004, ISA/JPO.

Ryosuke Kawamura and Hiroyuki Inaba, "A Note on Protection of Fingerprint Images by Digital Watermarking", Computer Security Symposium, Oct. 2002 (with English Abstract).

*Primary Examiner*—Aaron W Carter
(74) *Attorney, Agent, or Firm*—Harness, Dickey & Pierce, P.L.C.

(57) ABSTRACT

An iris region of an eye is detected from an original image (S1) and image conversion is performed to the detected iris region so that feature data unique to the person can not be extracted (S2). For example, the iris region is divided into a plurality of portions and respective images of divided portions are re-arranged in a predetermined order or at random.

7 Claims, 11 Drawing Sheets

Original iris image

Iris outer boundary
Pupil outer boundary

Predetermined iris pattern

Replacement

After replacement (a) Original iris image (b) After re-arrangement

Original iris image

Iris outer boundary
Pupil outer boundary

Predetermined iris pattern

Replacement

After replacement

Original iris image

Iris outer boundary
Pupil outer boundary

Predetermined iris pattern

Superimposition

After superimposition (a) No image conversion performed (b) Image conversion performed

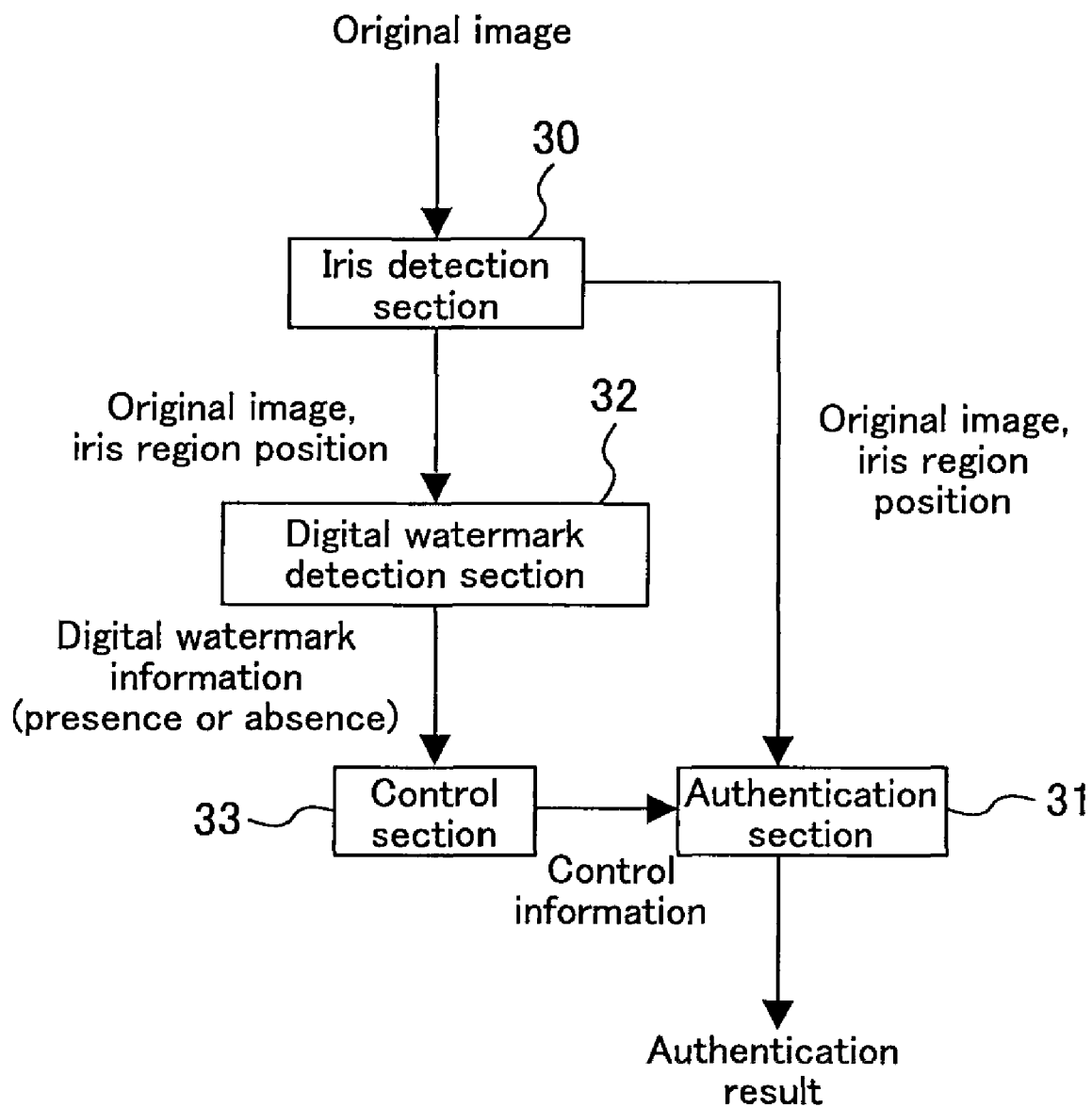

IMAGE PROCESSING METHOD, IMAGE PROCESSOR, PHOTOGRAPHIC APPARATUS, IMAGE OUTPUT UNIT AND IRIS VERIFY UNIT

CROSS-REFERENCE TO RELATED APPLICATION

This application is a divisional of U.S. patent application Ser. No. 10/509,462 filed on Sep. 28, 2004, now U.S. Pat. No. 7,519,199 issued Apr. 14, 2009. The entire disclosure of the above application is incorporated herein by reference.

TECHNICAL FIELD

The present invention relates to a technique for protecting personal information of an iris image.

BACKGROUND ART

In recent years, personal identification technologies using iris images started to be used in room access control in important facilities, ATMs (automated teller machines) at banks and the like, and PC log-in application and the like. Specifically, the method disclosed in Patent Reference 1 has been already commercialized around the world and is becoming the de facto world standard.

In the method of Patent Reference 1, an iris region is cut out from an image in which an iris is photographed, and the iris region is expressed in polar coordinates. Then, 2D Gabor wavelet filtering is performed to generate an iris code and personal authentication is performed by comparing the iris code generated from the image taken at a time of authentication to an iris code which has been registered in advance.

Moreover, as known techniques for protecting personal privacy, there are techniques for use in surveillance cameras, in which the face or body of a person in an image is obscured by a mosaic or painted out with a color (see, e.g., Patent References 2, 3 and 4).

(Patent Reference 1) Japanese Patent Publication No. 3307936

(Patent Reference 2) Japanese Laid-Open Publication No. 2000-261789

(Patent Reference 3) Japanese Laid-Open Publication No. 2000-278584

(Patent Reference 4) Japanese Laid-Open Publication No. 2001-186507

Problems that the Invention is to Solve

In recent years, with increase in resolution of imaging and display devices, it has become possible to obtain an iris image at a resolution (e.g., about 200 pixels in terms of iris diameter) required for iris authentication even when an image of the vicinity of an eye is taken without zooming in. Because of this, there is a risk that an iris image as personal data is easily obtained by others and illicitly used for spoofing authentication.

Especially, for persons such as actors/actresses and celebrities who frequently appear in various media, what they do is to release, at a high frequency, iris information as personal data to the public by themselves. Moreover, because of spread of digital still cameras and digital video cameras, even ordinary people other than actors/actresses and celebrities are exposed to the increasing risk that images of their irises are secretly photographed by a malicious person these days.

On the other hand, in Patent Reference 2 through 4, disclosed are techniques in which in view of privacy protection, mosaic processing or painting processing is performed to an image taken by a surveillance camera or the like to obscure the body or face of a person by a mosaic or painting so that the person can not be identified, i.e., nobody can not tell who the person is. However, for image processing for protecting personal data for an iris, which has been described above, no reference in which a particular method is disclosed or suggested was found in a research conducted by the present inventors.

In view of the above-described problems, it is therefore an object of the present invention to protect an image including a persons' face so that personal data for an iris is not illicitly used.

DISCLOSURE OF INVENTION

The present invention is for detecting an iris region of an eye from an original image and performing image conversion to the detected iris region so that feature data unique to a person can not be extracted. According to the present invention, feature data unique to a person can not be extracted from an image of an iris region and even if a malicious person obtains an iris image from an original image, the iris image can not be used for authentication. Therefore, spoofing authentication by unauthorized use of an iris image can be prevented.

Moreover, it is preferable that the image conversion herein is conversion which does not make the original image look unnatural. This means that, for example, image conversion is performed so that a person who sees an image can recognize an iris in an iris region. In other words, image conversion is performed so that it is not noticed that the image has been converted. Another way to say is that image conversion is performed so that a person can be distinguished by other part (e.g., face or figure) in an image than an iris, i.e., image conversion is performed to the extent to which a person can be identified or distinguished. If image conversion which does not make an original image look unnatural is performed in such a manner, the present invention can be also used for entertainment contents such as a movie.

Specifically, the present invention provides as an image processing method a method including: a first step of detecting an iris region of an eye of a person from an original image; and a second step of performing image conversion to the iris region detected in the first step so that feature data unique to the person can not be extracted.

The image conversion in the image processing method of the present invention is preferably image conversion in which the iris region is divided into a plurality of portions and respective images of divided portions are re-arranged in a predetermined order or at random. Alternatively, the image conversion is preferably image conversion in which an image of the iris region is replaced with a predetermined iris pattern image. As another option, the image conversion is preferably image conversion in which a predetermined iris pattern image is superimposed on an image of the iris region.

Moreover, it is preferable that the second step includes the steps of: decomposing an image of the iris region into pieces according to a spatial frequency, performing predetermined conversion to the piece with a predetermined band of the decomposed image, and re-synthesizing the pieces with respective bands.

Moreover, the image conversion in the image processing method of the present invention is preferably image conversion in which a digital watermark is embedded in an image of the iris region.

Moreover, it is preferable that in the second step in the image processing method of the present invention, when the detected iris region has a smaller size than a predetermined size, the image conversion is not performed.

Moreover, the second step in the image processing method of the present invention preferably includes the steps of: performing reflection component separation to the detected iris region to obtain a diffusion reflection image and a specular reflection image; performing the image conversion to the diffusion reflection image; and adding the specular reflection image to the image which has been image-converted.

Moreover, the present invention provides as an image processing apparatus an apparatus including: an iris detection section for detecting an iris region of an eye of a person from an original image; and an image conversion section for performing image conversion to the iris region detected by the iris detection section so that feature data unique to the person can not be extracted.

Moreover, the present invention provides as an image capturing apparatus an apparatus including: an image capturing section; and the image processing apparatus for receiving as the original image an image captured by the image capturing section.

Moreover, the present invention provides as an image output apparatus an apparatus including: the image processing apparatus; and an output section for visualizing an image which has been image-converted and output from the image processing apparatus and then outputting the image.

Moreover, the present invention provides as an iris authentication apparatus an apparatus including: an iris detection section for detecting an iris region of an eye of a person from an original image; an authentication section for performing authentication using an image of the iris region detected by the iris detection section; a digital watermark detection section for detecting the presence or absence of a predetermined digital watermark for the iris region detected by the iris detection section; and a control section for controlling an execution/stop of an authentication operation of the authentication section according to the presence or absence of the digital watermark detected by the digital watermark detection section.

According to the present invention, extraction of feature data unique to a person from an image of an iris region is made impossible by image conversion. Accordingly, spoofing authentication using unauthorized use of the iris image can be prevented. Moreover, the image conversion does not make the original image look unnatural. Therefore, the image conversion can be used for entertainment contents such as a movie.

BRIEF DESCRIPTION OF DRAWINGS

FIG. 15 is a block diagram of an iris authentication apparatus according to a fourth embodiment of the present invention.

BEST MODE FOR CARRYING OUT THE INVENTION

Hereinafter, embodiments of the present invention will be described with reference to the accompanying drawings.

First Embodiment

Figure 1:
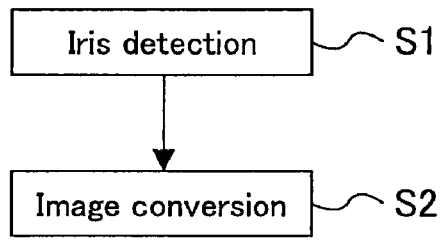
FIG. 1 is a flowchart of an image processing method according to a first embodiment of the present invention.

FIG. 1 is a flowchart of an image processing method according to a first embodiment of the present invention. Hereinafter, the image processing method of this embodiment will be described by following a flow of FIG. 1.

Figure 2:
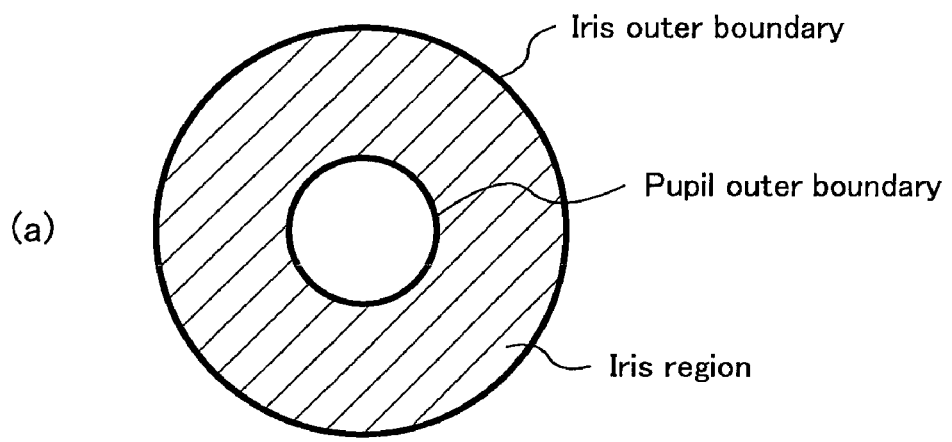
FIG. 2 is a conceptual view illustrating an iris region.
Figure 2:
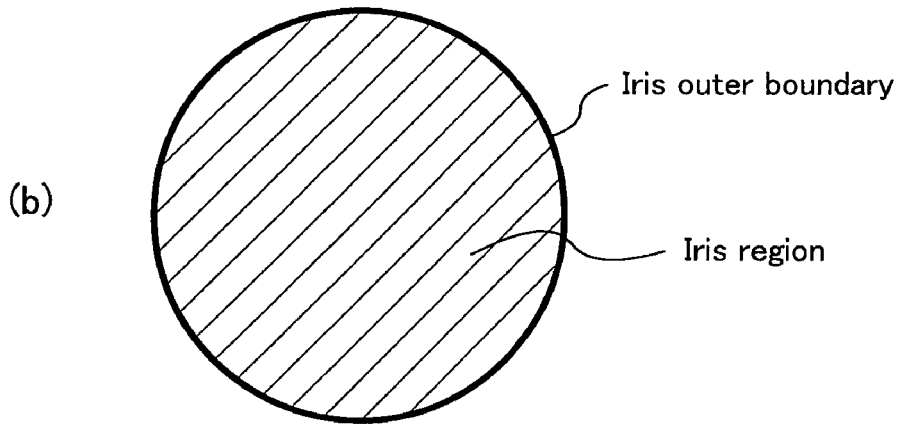

First, in Step S1 (a first step), from an original image including a face of a person, an iris region of an eye of the person is detected. As shown in FIG. 2(a), an iris region herein strictly means a region between the outer boundary of an iris (i.e., the boundary between the iris and the sclera) and the boundary of a pupil (i.e., the boundary between the pupil and the iris). When a face of a person is photographed from the front, each of the iris outer boundary and the pupil outer boundary can be approximated by a circle. On the other hand, when a face of a person is photographed from the oblique direction, each of the iris boundary and the pupil boundary can be approximated by an oval.

Moreover, as shown in FIG. 2(b), the iris region may be a region surrounded by only the iris outer boundary. Moreover, when a top or bottom eyelid covers part of the iris region, other part of the iris region except for the region covered by the eyelid can be an iris region.

Note that a method for detecting the iris region from the original image does not have to be a particular method. For example, a combination of a technique for detecting a human figure region from an original image, a technique for detecting a human head from a human figure region, and a technique for detecting an iris region from a human head may be used.

Next, in Step S2 (a second step), image conversion is performed to the iris region detected in the first step S1. The image conversion herein may be any conversion as long as feature data unique to a person can not be extracted from the converted image of the iris region.

Specifically, image conversion is performed using any one of the following methods. Needless to say, a combination of the following methods may be used.

<Method 1>

Figure 3:
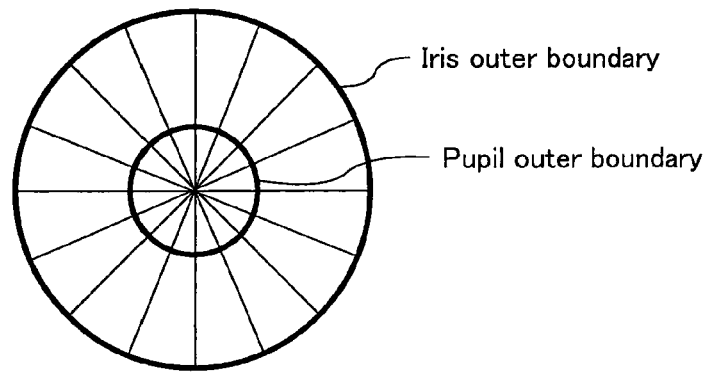
FIG. 3 is a view illustrating an example of how to divide an iris region.
Figure 4:
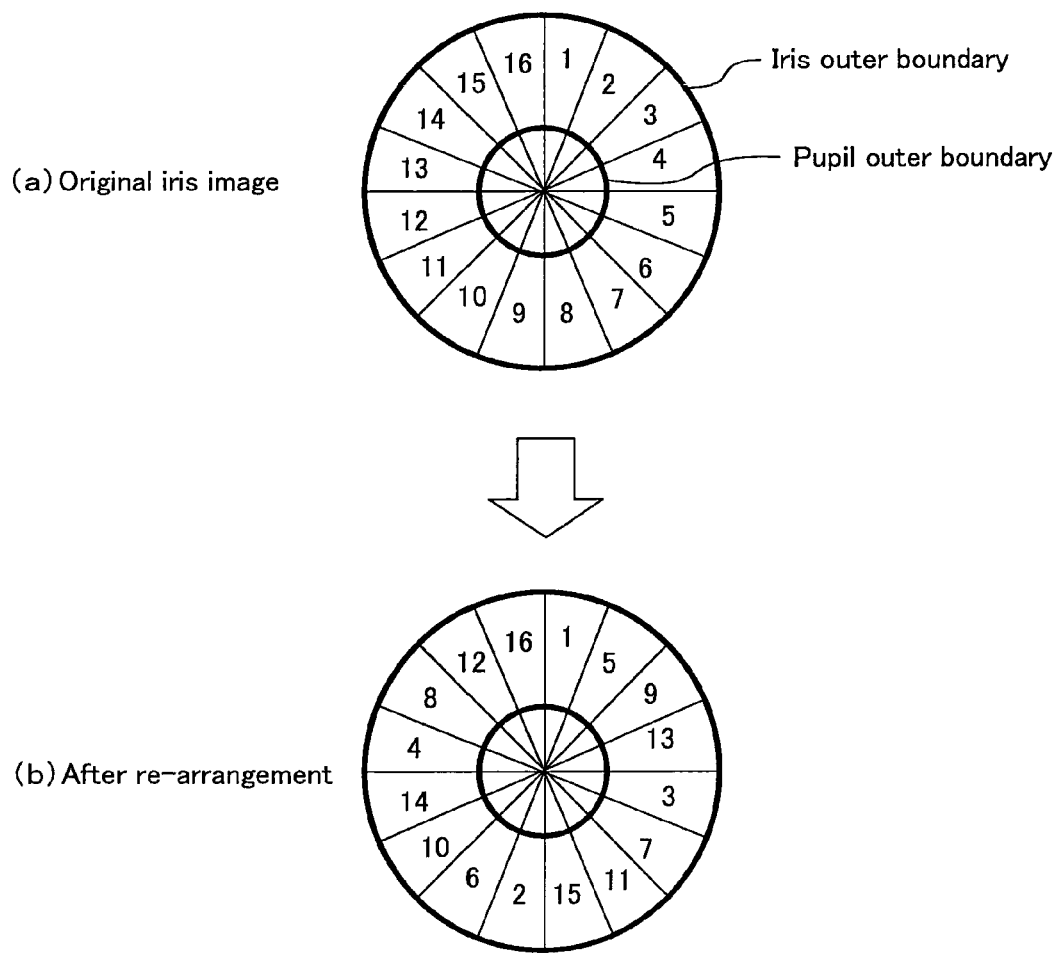
FIG. 4 is a view illustrating an example of re-arrangement as image conversion.

As shown in FIG. 3, an iris region is divided in the circumferential direction using a plurality of segments each of which passes through the center of a pupil (or the center of an iris). Then, divided portions of the iris region are re-arranged in a predetermined order or at random. An example of re-arrangement is shown in FIG. 4. As shown in FIG. 4(a), numbers "1" through "16" are allocated to the divided portions of the iris region, respectively, and the divided portions are re-arranged in a predetermined order as shown in FIG. 4(b). When the divided portions are re-arranged in a predetermined order, the order needs to be kept secret.

Note that when the original image includes both eyes of a person, divided portions of respective iris regions of the eyes may be re-arranged between both of the eyes. Moreover, when the original image includes irises of a plurality of persons, divided portions of respective iris regions of the persons may be re-arranged among the persons. When respective iris regions of both eyes or different persons have different sizes, magnification/reduction in size can be performed so that the iris regions have the same size and then re-arrangement can be performed. When respective irises of different persons have different colors, color conversion can be performed so that the irises have the same color and then re-arrangement can be performed. When the face of a person in an image is photographed from the oblique direction, linear transformation can be performed so that irises have the same shape and then re-arrangement can be performed.

In this manner, an iris region is divided in the circumference direction and divided portions of the iris region are re-arranged. Thus, even if an iris image is obtained from the original image, the iris image can not be illicitly used for authentication. Note that an iris region does not have to be divided in the circumference direction but some other dividing method may be also used as long as the re-arranged iris region does not look unnatural.

Moreover, in the techniques disclosed in Patent References 2 through 4, in order to protect personal privacy, a region of an image corresponding to the face or body of a person is obscured by a mosaic or painted out with a color so that the person can not be identified. Thus, if the techniques are used for entertainment contents such as a movie, an image looks unnatural, so that the viewer has an uncomfortable feeling. In contrast, according to the method of this embodiment, even when image conversion is performed, an iris is still present in an iris region and an image after the conversion does not look unnatural. Therefore, the method of this embodiment can be used for entertainment contents such as a movie.

Figure 5:
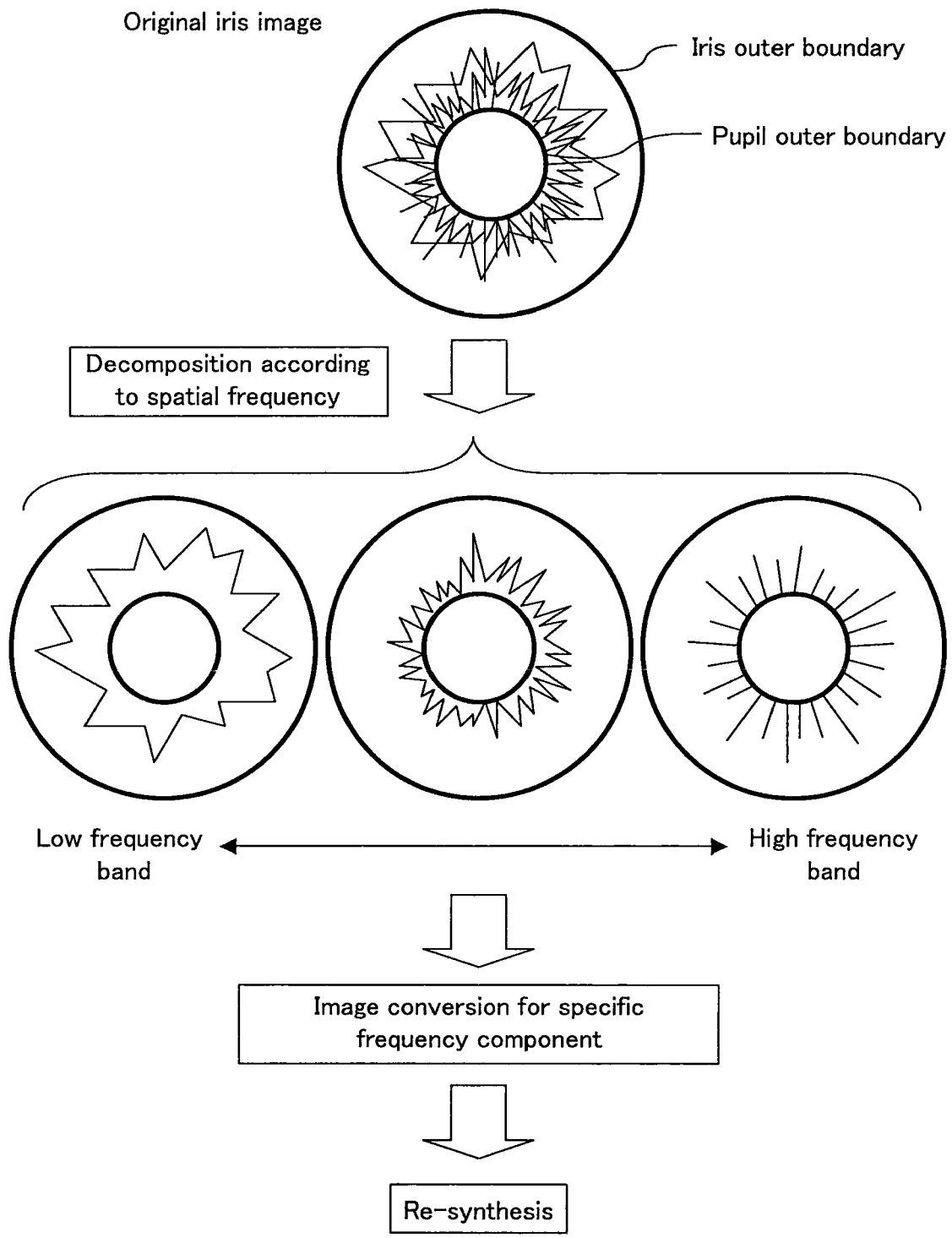
FIG. 5 is a conceptual view illustrating a process step of decomposing an iris image according to a spatial frequency and performing image conversion to a predetermined frequency component.

Note that, when an iris region is divided and divided portions are re-arranged, seams between divided portions might be highly visible. In such a case, with low frequency components of an iris image left as it is, only high frequency components thereof may be re-arranged. That is, as shown in FIG. 5, the iris image is decomposed into a plurality of pieces according to a special frequency. Specifically, LPF (low pass filter), BPF (band pass filter) and HPF (high pass filter) are used so as to generate a low-pass image, a middle-pass image and a high-pass image, respectively. Then, the above-described re-arrangement is performed to a high-pass image and then images of all bands are summed and re-synthesized.

This manner can make seams between divided portions of an iris region even less visible. Moreover, image conversion is performed only to high frequency components, so that low frequency components which are relatively high visible to human eyes still have an iris pattern of a subject person. Accordingly, an image after the conversion advantageously looks more natural. Furthermore, since the high frequency components are converted, feature data of the original iris image can not be extracted. Therefore, the iris image can not be illicitly used for authentication.

Note that the frequency range for image conversion is not limited to the high frequency portion but may be some other frequency range. Moreover, image conversion may be performed not to predetermined frequency components but to randomly selected frequency components. In such a case, reproduction by a third person becomes more difficult. Furthermore, in the above-described example, the iris region is decomposed into three frequency bands. However, the number of bands with decomposition may be some other number. Moreover, the number of bands for image conversion is not limited 1 but may be a plural number.

Moreover, the spatial frequency may be a frequency in the orthogonal coordinate system or a frequency in the polar coordinate system in which the center of a pupil or an iris is the origin.

Note that the above-described re-arrangement technique in which divided portions of the iris region is re-arranged in a predetermined order can be used for sending and receiving an iris image. That is, if the order in re-arrangement is shared by only a sender and a receiver, an iris image can be encrypted and then sent/received safely.

<Method 2>

Figure 6:
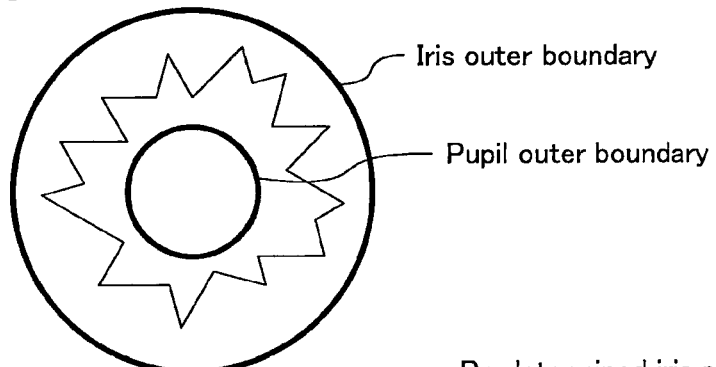
FIG. 6 is a view illustrating replacement as image conversion.
Figure 6:
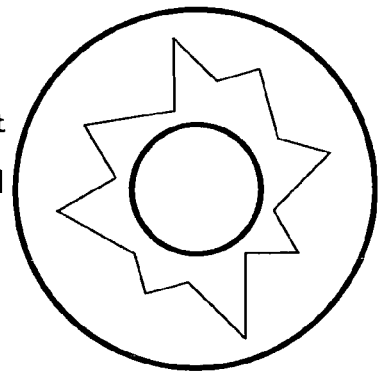
Figure 6:
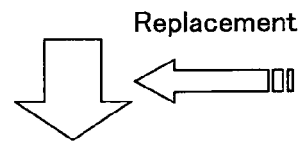
Figure 6:
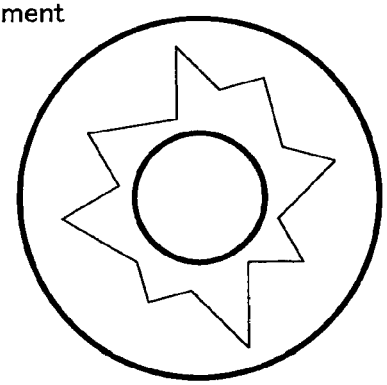

As shown in FIG. 6, an image of an iris region in an original image is replaced with a predetermined iris pattern image which has been prepared in advance. As the predetermined iris pattern image, for example, an average image of iris patterns of a plurality of persons or an average image of both eyes of a person can be used. When the size of the predetermined iris pattern image is different from that of the iris region, magnification/reduction in size can make the iris pattern image and the iris region have the same size before replacement. Moreover, when the iris pattern image has a different color from the iris region, color conversion can make the iris pattern image and the iris region have the same color before replacement. Furthermore, when a face of a person is photographed from the oblique direction, linear transformation can make the iris pattern image and the iris region have the same shape before replacement. Alternatively, an artificial iris image which has been artificially generated may be used as the predetermined iris pattern image.

In this manner, the iris region is replaced with the iris pattern image which has been prepared in advance. Thus, even if an iris image is obtained from the original image, the iris image can not be illicitly used for authentication. Moreover, unlike image conversion such as mosaic processing, even when image conversion is performed, an iris is still present in an iris region and an image after the conversion does not look unnatural. Therefore, the method of this embodiment can be used for entertainment contents such as a movie.

Note that as shown in FIG. 5, the iris image may be decomposed into a plurality of pieces according to the spatial frequency and the replacement of this method may be applied to predetermined frequency components or randomly selected frequency components. Thereafter, images of all bands are summed and re-synthesized. Moreover, as a particular example, a high frequency component image may be replaced with an image in which the luminance of each of all pixels is 0. This method corresponds to application of LPF to an iris image to remove high frequency components required for authentication.

<Method 3>

Figure 7:
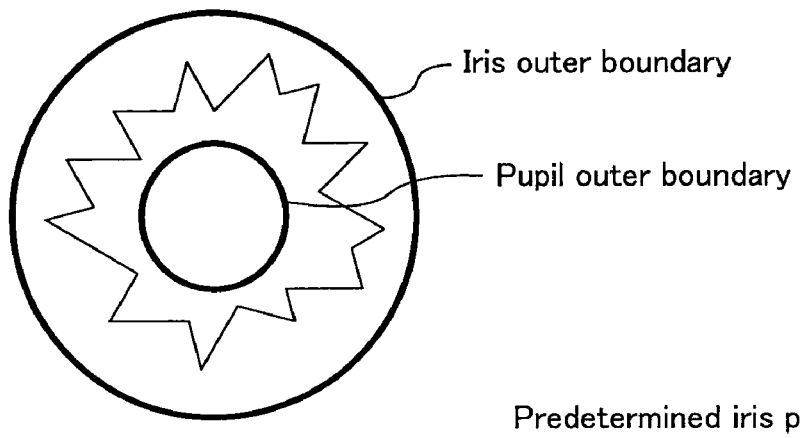
FIG. 7 is a view illustrating superimposition as image conversion.
Figure 7:
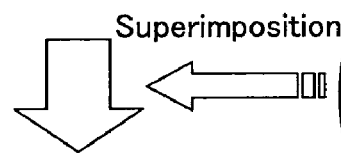
Figure 7:
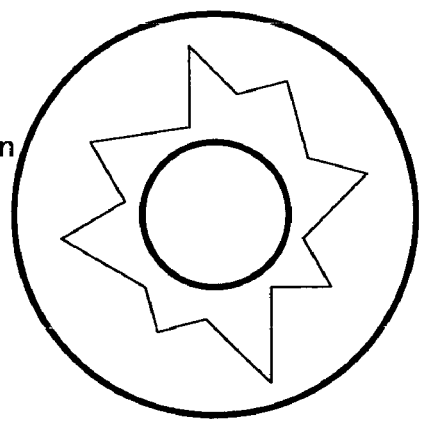
Figure 7:
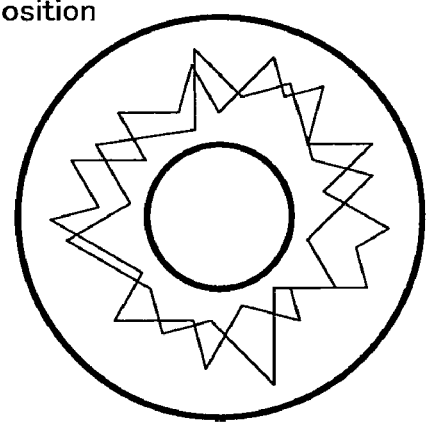

As shown in FIG. 7, a predetermined iris pattern image which has been prepared in advance is superimposed to an image of an iris region in an original image. The image superimposition is performed by introducing a blend ratio α (0<α<1) and performing calculation for each corresponding pixel, using the following equation:

$$I3 = \alpha \cdot I1 + (1-\alpha) \cdot I2$$

where I1 is a luminance value of the original image, I2 is a luminance value of an image to be superimposed, and I3 is a luminance value after superimposition. Note that when α=0, this processing is equivalent to the replacement described in Method 2.

As the predetermined iris pattern image, for example, an image obtained by imitating a reflection of extraneous light into an iris region or an iris pattern image of a particular person may be used. When the size of the predetermined iris pattern image is different from that of the iris region, magnification/reduction in size can make the iris pattern image and the iris region have the same size before superimposition. Moreover, when the iris pattern image has a different color from the iris region, color conversion can make the iris pattern image and the iris region have the same color before superimposition. Furthermore, when a face of a person is photographed from the oblique direction, linear transformation can make the iris pattern image and the iris region have the same shape before superimposition. Alternatively, an artificially generated imitation iris image may be used as the predetermined iris pattern image.

In this manner, the predetermined iris pattern image which has been prepared in advance is superimposed to the iris region. Thus, even if an iris image is obtained from the original image, the iris image can not be illicitly used for authentication. Moreover, unlike image conversion such as mosaic processing, a reflection image which occurs in the actual world is superimposed, or an actual iris image of a person or an artificially generated iris image is superimposed to generate a synthesized iris image. Thus, a converted image does not look unnatural. Therefore, the method of this embodiment can be used for entertainment contents such as a movie.

Note that as shown in FIG. 5, the iris image may be decomposed into a plurality of pieces according to the spatial frequency and the superimposition of this method may be applied to predetermined frequency components or randomly selected frequency components.

<Method 4>

A digital watermark is embedded in an iris region in an original image. As digital watermarking, a specific technique is not required but an arbitrary technique may be used. Then, an iris authentication apparatus which supports a digital watermarking described later can block unauthorized use. Specifically, a digital watermark is embedded in an iris region and an authentication apparatus which supports the digital watermark is used, so that even if an iris image is obtained from an image, the iris image can not be illicitly used for authentication. Moreover, unlike image conversion such as mosaic processing, using digital watermarking does not make an apparent image look unnatural. Therefore, the method of this embodiment can be used for entertainment contents such as a movie.

Figure 8:
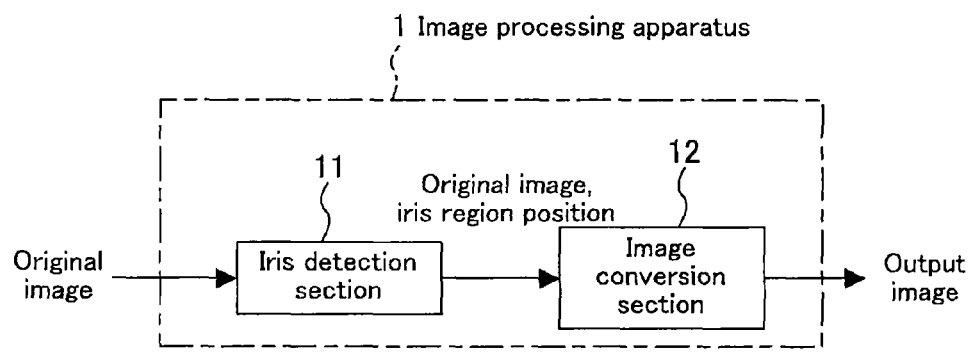
FIG. 8 is a block diagram of an image processing apparatus according to the present invention.

FIG. 8 is a block diagram illustrating the configuration of an image processing apparatus according to this embodiment. The image processing apparatus 1 of FIG. 8 is configured so as to be able to execute each of the above-described image processing methods and includes an iris detection section 11 and an image conversion section 12.

An original image is received by the iris detection section 11. The iris detection section 11 performs the same process as Step S1 to detect an iris region of an eye of a person from the received original image. Then, positional information for the detected iris region and the original image are supplied to the image conversion section 12. The image conversion section 12 performs the same process as the second step S2 to perform image conversion to the iris region so that feature data unique to the person can not be extracted.

Figure 9:
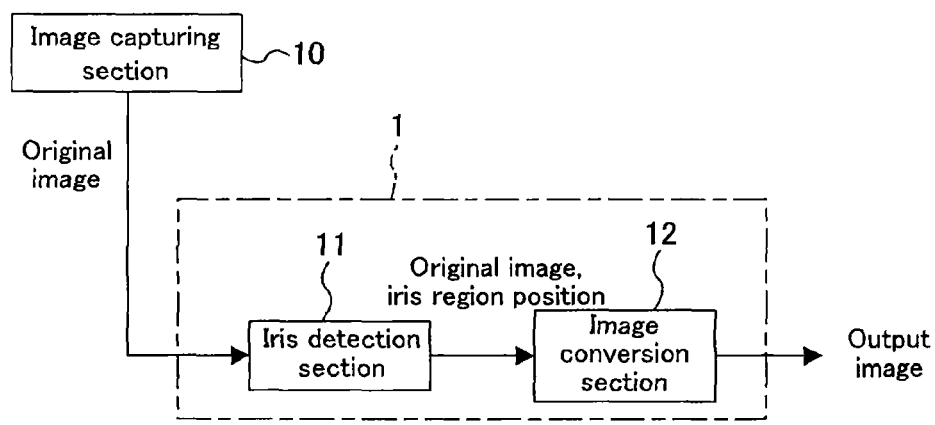
FIG. 9 is a block diagram of an image capturing apparatus according to this embodiment.

FIG. 9 is a block diagram illustrating the configuration of an image capturing apparatus according to this embodiment. The image capturing apparatus of FIG. 9 includes the image processing apparatus 1 of FIG. 8 and an image capturing section 10. The image capturing apparatus of this embodiment includes general apparatuses for capturing images such as a video camera and a digital still camera.

The image capturing section 10 includes a lens and an imaging device (not shown) and captures a still image or a moving picture. An image captured by the image capturing section 10 is received as an original image by the image processing apparatus 1 and then the above-described imaging processing is executed. In processing of a moving picture, image processing is performed to each field image or each frame image and a moving picture generated using each processed field image or each processed frame image is finally output from the image processing apparatus 1.

Note that the image capturing section 10 and the image processing apparatus 1 may be united as a unit. Thus, it becomes very difficult to retrieve the original image before image processing. Accordingly, the security level is increased. That is, it is preferable to form the image capturing section 10 and the image processing apparatus 1 as a single LSI.

Figure 10:
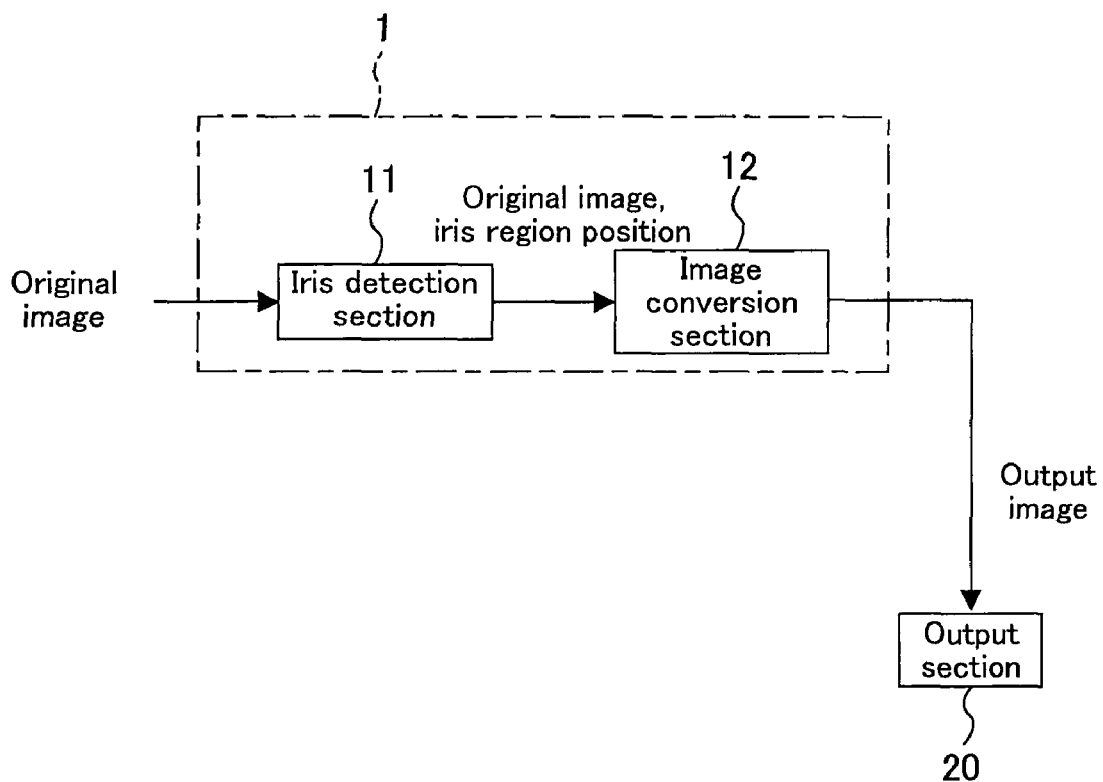
FIG. 10 is a block diagram of an image output apparatus according to the present invention.

FIG. 10 is a block diagram illustrating the configuration of an image output apparatus according to this embodiment. The image output apparatus of FIG. 10 includes the image processing apparatus 1 of FIG. 8 and an output section 20. The image output apparatus according to this embodiment includes general apparatuses for visualizing and outputting image data such as a monitor, a TV set and a printer.

The original image is image-processed in the above-described manner by the image processing apparatus 1. In processing of a moving picture, image processing is performed to each field image or each frame image and a moving picture image generated using each processed field image or each processed frame image is finally output from the image processing apparatus 1. The output section 20 visualizes and outputs a converted image output from the image transforming section 1 by displaying the converted image on a monitor or printing it on paper or the like.

As has been described, according to this embodiment, image conversion which inhibits extraction of feature data unique to a person is performed to an iris region. Thus, spoofing authentication by unauthorized use of an iris image can be prevented.

Note that image conversion according to this invention is not limited to the method described herein but may be any method which inhibits extraction of feature data unique to a person. And it is preferable not to give the original image unnaturalness, but even a method which makes the original image look slightly unnatural may be used.

Second Embodiment

Figure 11:
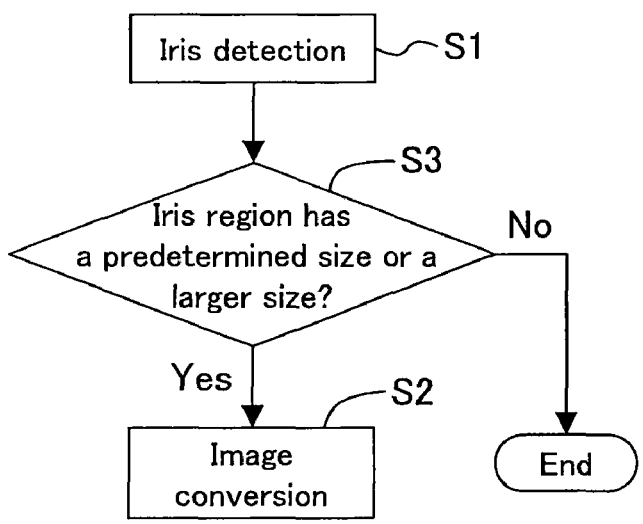
FIG. 11 is a flowchart of an image processing method according to a second embodiment of the present invention.

FIG. 11 is a flowchart of an image processing method according to a second embodiment of the present invention. In FIG. 11, Steps S1 and S2 are performed in the same manner as in the first embodiment. According to this embodiment, in Step S3, whether or not the size of an iris region detected in Step S1 is equal to or larger than a predetermined size is judged and if the iris region is smaller than the predetermined size, the image conversion of Step S2 is not performed and the process is completed. Specifically, for example, if the diameter of the iris region is smaller than a predetermined threshold TH (pixel), image conversion is not performed and the process is completed. Steps S2 and S3 correspond to the second step of the present invention.

In iris authentication systems which has been currently commercialized, an image is captured at a relatively high resolution at which the diameter of an iris image is about 200-300 pixels. If an iris image with a low resolution is used for authentication, the amount of information is insufficient for authentication. Accordingly, a false rejection rate (FRR) is increased. Therefore, image conversion is not required if the size of an iris region is too small to be used for authentication. Based on such a view, this embodiment has been devised.

Figure 12:
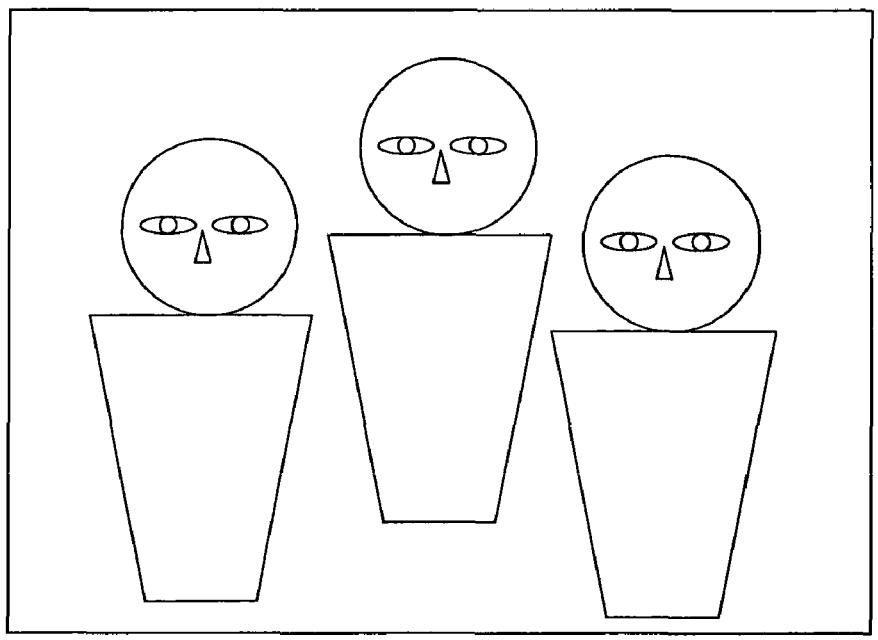
FIG. 12 is a view conceptually illustrating process steps according to the second embodiment of the present invention.
Figure 12:
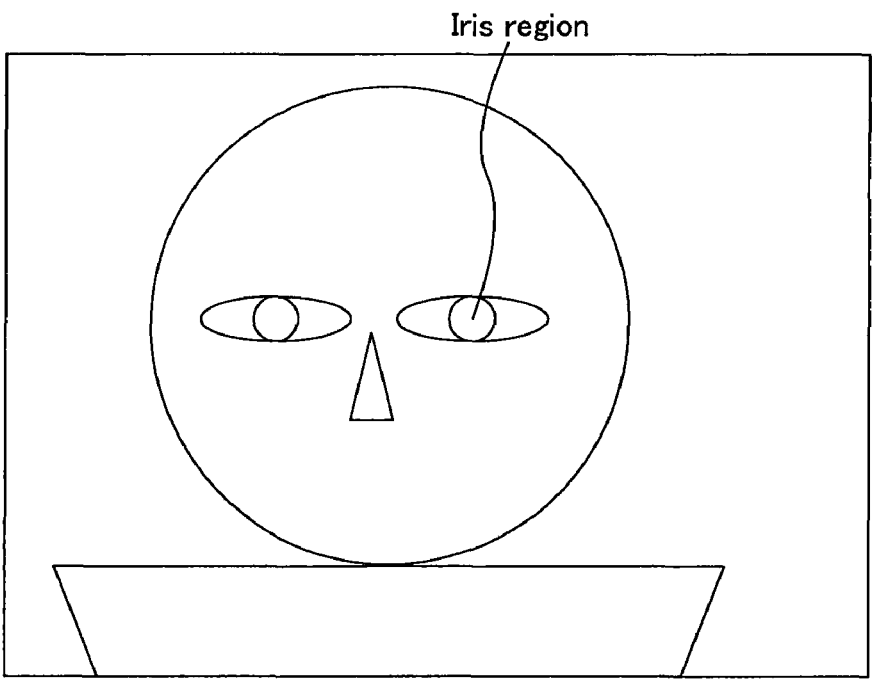

For example, assume that in the original image including a plurality of persons as shown in FIG. 12(a), the number of iris regions having a diameter of the threshold TH or more is 0. In this case, image conversion is not performed to any one of the iris regions and the process is completed. On the other hand, assume that in the original image taking a person's face in close-up as shown in FIG. 12(b), the diameter of an iris region of each of the eyes is the threshold TH or more. In such a case, image conversion is performed to each of two iris regions. Needless to say, if in an original image including a plurality of persons, an iris region of one person at a shorter distance has a diameter equal to or larger than the threshold TH and an iris region of one person at a longer distance has a smaller diameter than the threshold TH, image conversion is performed to the iris region of the former person but not to the iris region of the latter one.

Note that the threshold TH herein can be automatically determined, for example, using a large-scale iris image database. Specifically, the false rejection rate with respect to the iris diameter can be examined by changing the size (diameter) of an iris image to be authenticated and then a value for the iris diameter at which the false rejection rate is sufficiently large can be set as the threshold TH. Needless to say, some other setting method is used.

As has been described, according to this embodiment, image conversion is not performed to an iris image having a low resolution which is not suitable to authentication application and thus the amount of processing is reduced. Note that in this embodiment, the size of an iris region is specified by its diameter, but some other index such as the area (the number of pixels) of an iris region may be used.

Note that when the image processing of this embodiment is executed in the configurations of FIGS. 8 through 10, Steps S2 and S3 can be executed by the image conversion section 12.

Third Embodiment

Figure 13:
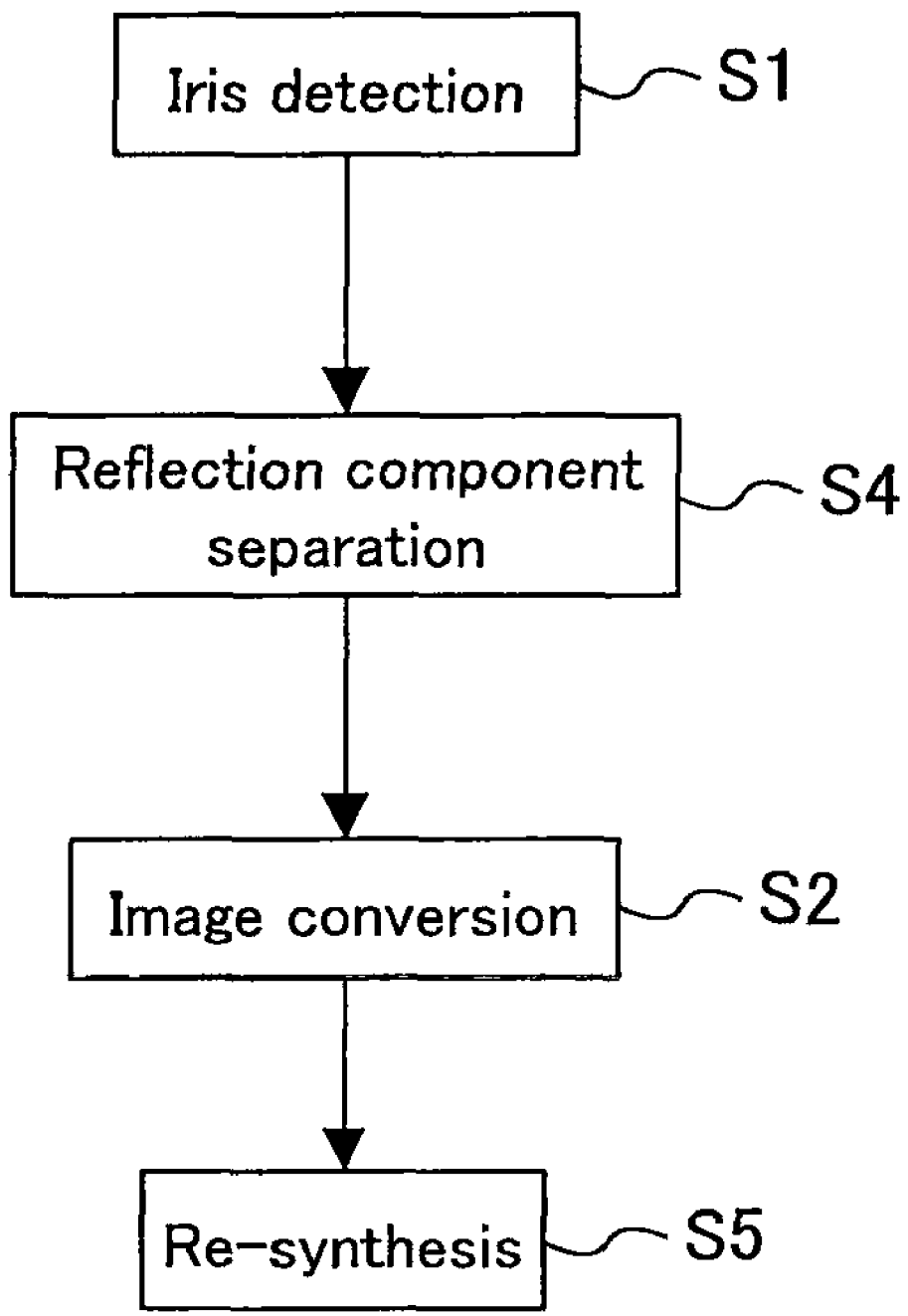
FIG. 13 is a flowchart of an image processing method according to a third embodiment of the present invention.

FIG. 13 is a flowchart of an image processing method according to a third embodiment of the present invention. In FIG. 13, Step S1 is performed in the same manner as in the first embodiment. Then, in Step S4, reflection component separation is performed to an iris region detected in the Step S1 so as to separate a diffusion reflection image and a specular reflection image from each other. In Step S2, similar image conversion to that of the first embodiment is performed with a diffusion reflection image obtained in Step S4 as a target. Then, in Step S5, a specular reflection image obtained in Step S4 is added to the image after the image conversion in Step S2, thereby re-synthesizing the images. Steps S4, S2 and S5 together form the second step of the present invention.

A captured iris region has often an extraneous light reflection (specular reflection component) superimposed in due to the reflection of an object in the front of an iris on a cornea surface. If image conversion is performed to an iris region including an extraneous light reflection, a processed image may look unnatural. To cope with such a problem, according to this embodiment, image conversion is performed only to diffusion reflection components after reflection component separation and the converted diffusion reflection components are re-synthesized with specular reflection components. Thus, unnaturalness of a processed image is reduced.

Figure 14:
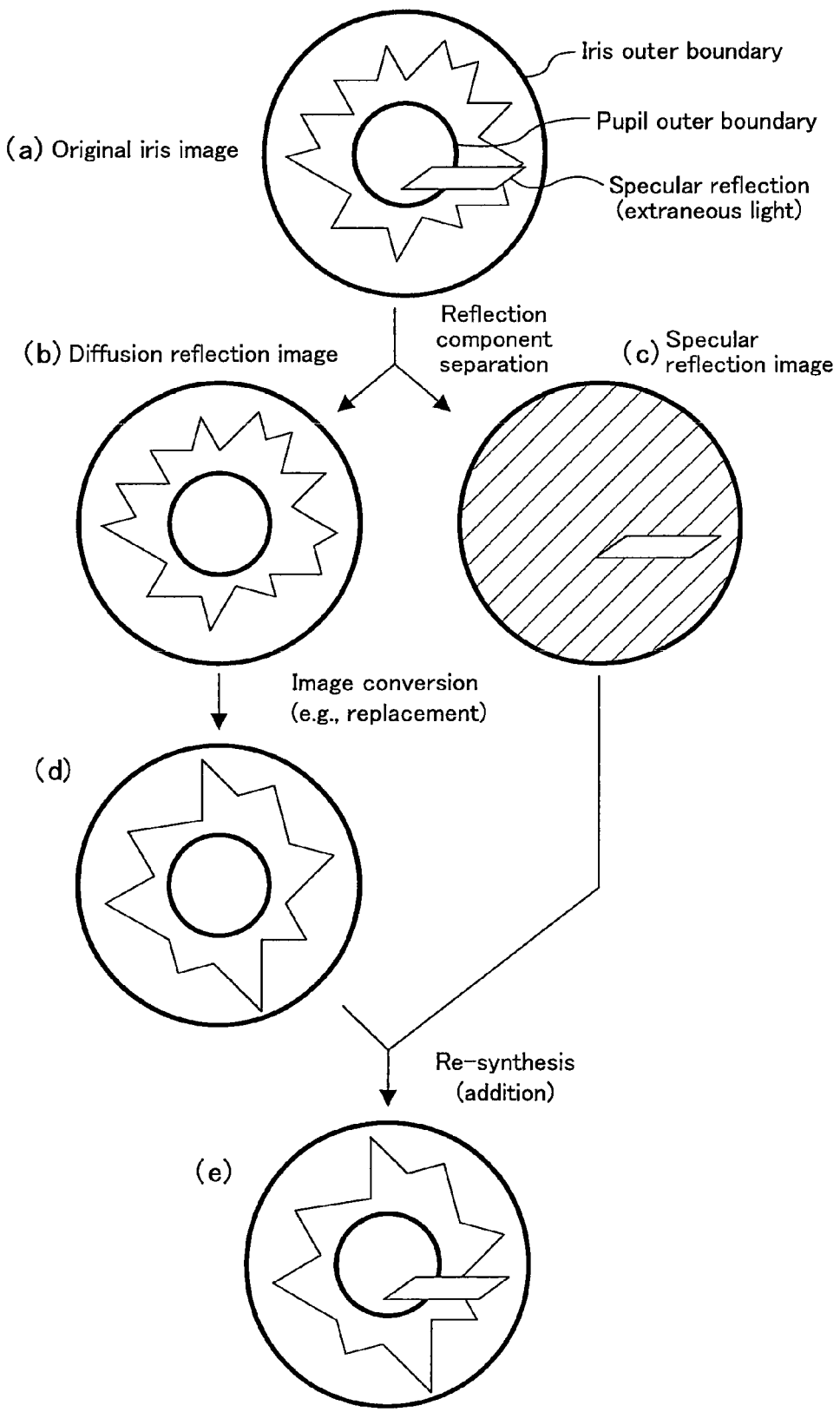
FIG. 14 is a view conceptually illustrating process steps according to the third embodiment of the present invention.

FIG. 14 is a view conceptually illustrating an example of image processing according to this embodiment. For example, reflection component separation is performed to an original image of FIG. 14(a) including a specular reflection (extraneous light reflection) to obtain a diffusion reflection image of FIG. 14(b) and a specular reflection image of FIG. 14(c). Then, image conversion (e.g., replacement in this case) is performed to the diffusion reflection image of FIG. 14(b) to obtain an image of FIG. 14(d). Furthermore, the image of FIG. 14(d) after the image conversion and the specular reflection image of FIG. 14(c) are added to each other to obtain an image of FIG. 14(e).

The reflection component separation in Step S4 can be performed using an arbitrary method. For example, if an incident angle of a light source which causes a specular reflection (extraneous light reflection) is equal to the Brewster angle, diffusion reflection components can be completely separated from specular reflection components using a polarizing filter. Needless to say, any other method can be used as long as diffusion reflection components and specular reflection components are separated.

Note that the image conversion in Step S2 is not limited to replacement but may be the method described in the first embodiment or some other method.

As has been described, according to this embodiment, after an extraneous light reflection (specular reflection) depending on a light source (the foreground of an iris) in image capturing has been separated, image conversion is performed only to a diffusion reflection image and then re-synthesis with specular reflection components is performed. Thus, more natural image conversion can be performed.

Fourth Embodiment

A fourth embodiment of the present invention relates to an iris authentication apparatus which supports embedding of a digital watermark as image conversion according to the first embodiment. FIG. 15 is a block diagram illustrating the configuration of the iris authentication apparatus of this embodiment. The iris authentication apparatus includes an iris detection section 30 for detecting an iris region of an eye of a person from an original image, an authentication section 31 for performing authentication using an image of the iris region detected by the iris detection section 30, a digital watermark detection section 32 for detecting the presence or absence of a predetermined digital watermark for the iris region, and a control section 33 for controlling execution/stop of an authentication operation of the authentication section 31 according to an output of the digital watermark detection section 32, i.e., the presence or absence of the predetermined digital watermark.

When a digital watermark is embedded in an iris region image, the iris authentication apparatus of FIG. 15 performs a predetermined operation such as, for example, stop of an authentication operation. Needless to say, a digital watermark embedded through image conversion and a digital watermark detected by the iris authentication apparatus have to be common.

The iris detection section 30 performs the same as Step S1 in the first embodiment to detect the position of the iris region. The position of the detected iris region and the original image are sent to the authentication section 31 and the digital watermark detection section 32. The authentication section 31 performs iris authentication using an image of the iris region of the original image. For iris authentication, for example, the method of Patent Reference 1 can be used. Needless to say, some other iris authentication method can be used.

The digital watermark detection section 32 detects whether or not a predetermined digital watermark is embedded in the iris region of the original image. Obtained information about the presence or absence of the digital watermark is sent to the control section 40. When the digital watermark is embedded, the control section 40 judges that the iris image is illicitly obtained and sends an instruction for aborting authentication to the authentication section 31. Thus, the authentication operation in the authentication section 31 is stopped.

Note that when a digital watermark is embedded in the iris region, not only stopping an authentication operation but also, for example, calling a predetermined place/organization such as a security office, a security company and the police on assumption of illicit authentication may be performed as a predetermined processing.

As has been described, according to this embodiment, when a digital watermark is embedded in an iris image, a predetermined operation such as stopping an authentication operation is executed. Thus, spoofing authentication can be prevented.

Note that in this embodiment, when the digital watermark is embedded in the iris image, it is judged that the iris image is illicitly obtained. However, in contrast to this, the following method may be used. Specifically, a digital watermark is always embedded in an iris image by an image capturing means of the iris authentication apparatus and if a digital watermark is not embedded in an iris image, it is judged that the iris image is illicitly obtained by illicitly sending an image signal to the iris detection section without involving the image capturing means, for example. In such a case, if a digital watermark is not embedded, the control section 40 stops an authentication operation of the authentication section 31.

INDUSTRIAL APPLICABILITY

According to the present invention, feature data unique to a person can not be extracted from an iris image. Thus, for example, in personal authentication using an iris image, spoofing authentication can be prevented.

The invention claimed is:

1. An image processing method comprising:
   using an image processing apparatus to perform the following steps:
   a first step of detecting an iris region of an eye of a person from an original image;
   a second step of performing a predetermined image conversion to the iris region detected in the first step; and
   a third step of outputting the original image the iris region of which the predetermined image conversion has been performed to;
   wherein the predetermined image conversion is image conversion in which an image of the iris region is replaced with a predetermined iris pattern image which is an iris pattern image of a person different from the person or an artificial iris image artificially generated, the predetermined iris pattern image having been processed so that at least one of size, color and shape thereof is the same as the image of the iris region.

2. The method of claim 1, wherein the second step includes the steps of:
   decomposing an image of the iris region into pieces according to a spatial frequency,
   performing predetermined conversion to the piece with a predetermined band of the decomposed image, and
   re-synthesizing the pieces with respective bands.

3. An image processing method comprising:
   using an image processing apparatus to perform the following steps:
   a first step of detecting an iris region of an eye of a person from an original image;
   a second step of performing a predetermined image conversion to the iris region detected in the first step; and
   a third step of outputting the original image the iris region of which the predetermined image conversion has been performed to:
   wherein the predetermined image conversion is image conversion in which an image of the iris region is replaced with a predetermined iris pattern image, the predetermined iris pattern image having been processed so that at least one of size, color and shape thereof is the same as the image of the iris region,
   wherein in the second step, when the detected iris region has a smaller size than a predetermined size, the image conversion is not performed.

4. An image processing method comprising:
   using an image processing apparatus to perform the following steps:
   a first step of detecting an iris region of an eye of a person from an original image;
   a second step of performing a predetermined image conversion to the iris region detected in the first step; and
   a third step of outputting the original image the iris region of which the predetermined image conversion has been performed to;
   wherein the predetermined image conversion is image conversion in which an image of the iris region is replaced with a predetermined iris pattern image, the predetermined iris pattern image having been processed so that at least one of size, color and shape thereof is the same as the image of the iris region,
   wherein the second step includes the steps of:
   performing reflection component separation to the detected iris region to obtain a diffusion reflection image and a specular reflection image;
   performing the image conversion to the diffusion reflection image; and
   adding the specular reflection image to the image which has been image-converted.

5. An image processing apparatus comprising:
   an iris detection section for detecting an iris region of an eye of a person from an original image; and
   an image conversion section for performing a predetermined image conversion to the iris region detected by the iris detection section, wherein the original image the iris region of which the predetermined image conversion has been performed to is outputted, wherein the predetermined image conversion by the image conversion section is image conversion in which an image of the iris region is replaced with a predetermined iris pattern image which is an iris pattern image of a person different from the person or an artificial iris image artificially generated, the predetermined iris pattern image having been processed so that at least one of size, color and shape thereof is the same as the image of the iris region.

6. An image capturing apparatus comprising:
an image capturing section; and
the image processing apparatus of claim 5 for receiving as the original image an image captured by the image capturing section.

7. An image output apparatus comprising:
the image processing apparatus of claim 5; and
an output section for visualizing an image which has been image-converted and output from the image processing apparatus and then outputting the image.

* * * * *

UNITED STATES PATENT AND TRADEMARK OFFICE
CERTIFICATE OF CORRECTION

PATENT NO. : 7,734,069 B2
APPLICATION NO. : 12/358939
DATED : June 8, 2010
INVENTOR(S) : Kenji Kondo It is certified that error appears in the above-identified patent and that said Letters Patent is hereby corrected as shown below:

On the title page, the section entitled "Related U.S. Application Data" should read as follows:
-- Division of application No. 10/509,462, filed on Sep. 28, 2004, now Pat. No. 7,519,199, filed as application No. PCT/JP2004/004804, filed on Apr. 1, 2004. --

On the title page, the section entitled "Foreign Application Priority Data" has been omitted and should be inserted as follows:

-- Foreign Application Priority Data
Apr. 2, 2003  (JP) ................................................. 2003-098812 --

Signed and Sealed this

Sixteenth Day of November, 2010

David J. Kappos
*Director of the United States Patent and Trademark Office*